United States Patent [19]

Pettengill et al.

[11] Patent Number: 4,739,621
[45] Date of Patent: Apr. 26, 1988

[54] COOLING SCHEME FOR COMBUSTOR VANE INTERFACE

[75] Inventors: Jason S. Pettengill, Glastonbury; John S. Thackrah, Coventry; Dennis J. Sullivan, Vernon; Theodore G. Fox, Newington, all of Conn.

[73] Assignee: United Technologies Corporation, Hartford, Conn.

[21] Appl. No.: 659,748

[22] Filed: Oct. 11, 1984

[51] Int. Cl.⁴ ............................................. F02C 1/00
[52] U.S. Cl. ..................................... 60/757; 60/39.83; 415/175
[58] Field of Search ...................... 60/755, 757, 39.75, 60/39.31, 39.32, 39.83; 415/115, 175–177

[56] References Cited

U.S. PATENT DOCUMENTS

| | | | |
|---|---|---|---|
| 3,186,168 | 6/1965 | Ormerod et al. | 60/39.32 |
| 3,307,354 | 3/1967 | Macaulay et al. | 60/757 |
| 3,527,053 | 9/1970 | Horn | 60/39.75 X |
| 3,565,545 | 2/1971 | Bobo et al. | 60/39.75 X |
| 3,670,497 | 6/1972 | Sheldon | 60/39.32 |
| 4,025,226 | 5/1977 | Hovan | 415/115 |

Primary Examiner—Carlton R. Croyle
Assistant Examiner—Donald E. Stout
Attorney, Agent, or Firm—Norman Friedland

[57] ABSTRACT

The turbine vanes of a gas turbine engine immediately downstream of the combustor are maintained at a cool temperature by judiciously directing cooling air at the stagnation point ahead of the vane's leading edge at the juncture of the vane's airfoil section and platform.

1 Claim, 2 Drawing Sheets

COOLING SCHEME FOR COMBUSTOR VANE INTERFACE

TECHNICAL FIELD

This invention relates to gas turbine engines and particularly to the combustor and turbine vane assembly.

BACKGROUND ART

As is well known, the products of combustion delivered to the 1st stage turbine are at the highest temperature that the engine sees. It is equally well-known that engine efficiency is directly related to this temperature and the higher the temperature the more efficient the engine. Obviously, technology dictates that this temperature be as high as the thermal integrity of the component parts will allow and with the advent of higher temperature resistance alloys these temperatures have been exceedingly high.

In certain engine models, because of the increase in the temperature the component parts in proximity to the turbine/combustor have been experiencing high local metal temperatures resulting in burning, buckling and cracking problems. The problem area in which this invention is directed is best seen in FIG. 1a showing the heretofore assembly. The FIG. 1a is a partial showing of an annular combustor for a twin spool axial flow turbine power plant of the type exemplified by the engine models JT9D, PW2037 and PW4000 manufactured by Pratt & Whitney of United Technologies Corporation, the assignee of this patent application.

As noted in FIG. 1A (prior art), the inner and outer louver liners 10 and 12 are suitably attached to the vane supports 14 and 16 which are ultimately tied to the inner case 18 and outer case 20 all in a well-known manner. As is obvious from this construction, the inner and outer louver liners are constrained at the discharged end in a toroidally shaped body and define a passageway for leading the engine's working fluid into the space between the vanes 22 (one being shown) to impinge on the turbine blades 24. In this construction and as is apparent from FIG. 1B which is a projected view of FIG. 1A and as shown by the arrows, the cooling air which is introduced from the annular cavity 26 which is fed by the engine's compressor (not shown) is directed toward the critical parts of the vane assembly to assure that these parts withstand the hostile environment.

However, the problem in this design, as shown by the arrows in FIGS. 1A and 1B, the hot spots identified by reference letter A, is caused by high temperature, high velocity of the engines working fluid being displaced by the vane's leading edge 30, and consequently, migrating to the vane platforms 32 and 34 and the burner trailing edge 36 (in proximity to the location of the arrows B).

DISCLOSURE OF INVENTION

We have found that we can obviate the problem stated above by judiciously locating open-ended channels in the louver trailing edge for receiving cooling air and discreetly impinging it on the leading edge of the adjacent vane. The impingement may be directed to either the vane's outside or inside, but at the stagnation point of the working fluid which is at the vane's leading edge. By injecting this high velocity air directly at the junction of the vane leading edge and the vane platform, the displacement of the hot gas by the vane leading edge into the boundaries of the gas path is substantially attenuated, or even eliminated, thus minimizing the induced vortices illustrated by arrows B. Obviously this results in a much cooler gas temperature of the boundary layer. Additionally, the channels afford additional heat transfer surface enhancing the convective heat transfer coefficient to further cool the louver trailing edge.

By actual tests, it was found that there was an appreciable reduction in vane platform and burner trailing edge hot spots.

Other features and advantages will be apparent from the specification and claims and from the accompanying drawings which illustrate an embodiment of the invention.

BEST MODE FOR CARRYING OUT THE INVENTION

While this invention is described in the preferred embodiment for the engine models noted above, as will be obvious to one skilled in the art the invention has applicability to other types of engines. As is apparent, the problem is to assure that the critical components of the gas turbine engine do not become distressed and particularly the area in proximity to the louver trailing edge and the leading edge of the 1st row of vanes ahead of the 1st turbine stage (the area where the temperature of the engine is substantially the hottest).

Figure 1A:
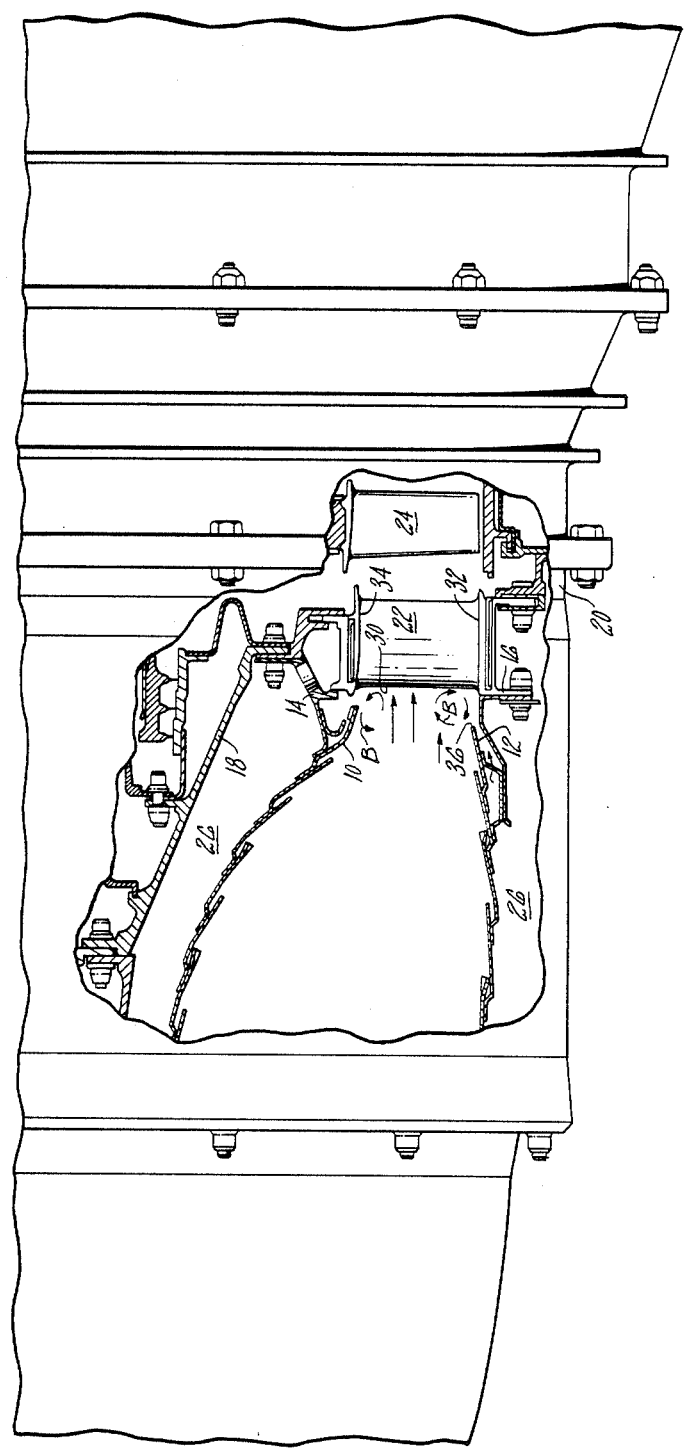
FIG. 1A is a partial view of a turbine type power plant in section showing the combustor/turbine vane assembly exemplifying the prior art construction.
Figure 1B:
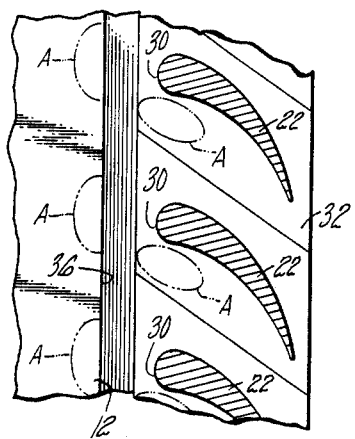
FIG. 1B is a partial projected view of the vane and trailing edge of the burner showing the problem of the heretofore construction.
Figure 3:
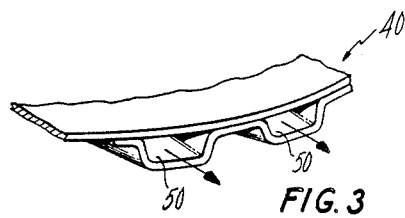
FIG. 3 is an oblique view of the channels located on the trailing edge of the louver liner of FIG. 2A.

For the sake of convenience and simplicity, only that portion that is necessary to an understanding of the invention will be described, but reference should be made to FIGS. 1A and 1B showing the identical structure before the incorporation of the invention together with the model engines identified above and incorporated herein by reference.

Figure 2A:
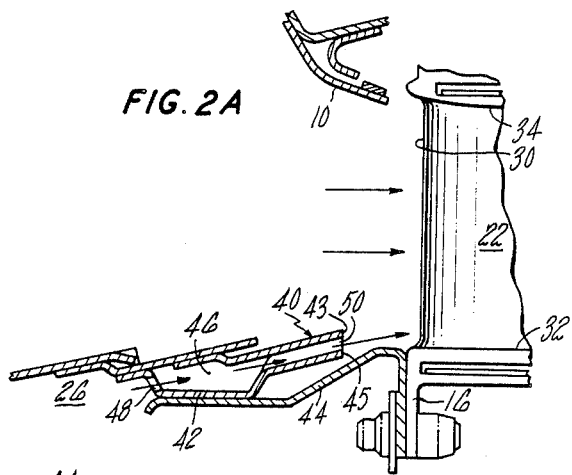
FIG. 2A is a partial view identical to FIG. 1A but with the invention added.
Figure 2B:
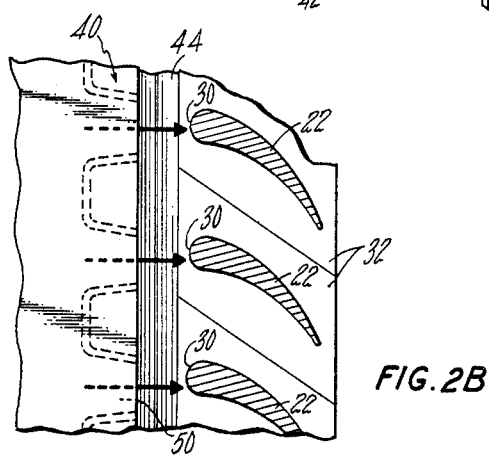
FIG. 2B is a partial projected view of FIG. 2A.

As can be seen in FIGS. 2A and 2B, the construction of the last louver 40 and trailing edge is modified in accordance with this invention. The louver support member 42 defining a sheath surrounding the louver 40 that is supported by the sheet metal attachment 44 connected to vane platform 32. The louver support member 42 and louver 40 define an annular cooling chamber 46 which is fed compressor discharge air from cavity 26 (see FIG. 1A) through apertures 48 (one being shown). As noted, the trailing edges 43 and 45 of louver 40 and louver support member 42 or sheath respectively, are spaced defining an annular open-ended channel. The discharge end of sheath 42 is deformed so as to be dimensioned into sinusoidal shaped configuration to define circumferentially spaced open-ended channels 50.

As is apparent from the foregoing, the open-ended channels 50 are judiciously located relative to the vanes 22 (see FIG. 2b) so that the cooling air which is at a relatively high velocity is directed toward only the region created by the leading edge and platform of the vanes 22. As was mentioned above, this serves to louver the temperature of the boundaries of the hot gas path (fluid working medium) so as to attenuate and even in some instances eliminate the vortices that were induced by the vanes as shown in the prior art design. The incorporation of the channels serve to provide high "back side" convective heat transfer coefficients to further cool the trailing edge of the louver liner.

It should be understood that the invention is not limited to the particular embodiments shown and described herein, but that various changes and modifications may be made without departing from the spirit and scope of this novel concept as defined by the following claims.

We claim:

1. For a gas turbine engine having a combustor, turbine vanes and a turbine axially spaced but adjacent to said turbine vanes, said combustor including louver liners configured to define an annular passageway for directing the products of combustion between said turbine vanes, each of said turbine vanes including an airfoil section having a stagnation point at the leading edge and a platform section at the root of said airfoil section, a support structure attached to said platform section supporting said louver liners, a sheath in cooperation with said support structure for defining therewith a passageway for leading cooling air onto said turbine vanes, said support structure and said sheath being configured into a generally sinusoidally shaped discharge end providing circumferentially spaced alternate closed and open-ended passages said open ended passages located in line with each of said vanes for directing said cool air at the junction of the leading edge of said airfoil section of the turbine vanes and said platform and adjacent said stagnation point of the combustion products ingressing between said turbine vanes whereby the vortices adjacent said stagnation point are attenuated so that the boundary layer of the combustion products passing adjacent said turbine vanes and said platform is maintained at a relatively cool temperature relative to the temperature had the vortices not been attenuated.

* * * * *